US009586766B2

(12) United States Patent
Nakano

(10) Patent No.: US 9,586,766 B2
(45) Date of Patent: Mar. 7, 2017

(54) CONVEYING APPARATUS

(71) Applicant: Kabushiki Kaisha Toshiba, Minato-ku (JP)

(72) Inventor: Toshiki Nakano, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/066,765

(22) Filed: Mar. 10, 2016

(65) Prior Publication Data

US 2016/0264362 A1    Sep. 15, 2016

(30) Foreign Application Priority Data

Mar. 12, 2015    (JP) .................. 2015-049499

(51) Int. Cl.
*B65G 43/00*    (2006.01)
*B65G 47/31*    (2006.01)
(Continued)

(52) U.S. Cl.
CPC .............. *B65G 47/31* (2013.01); *B65G 43/08* (2013.01); *B65G 43/10* (2013.01); *B65H 29/12* (2013.01);
(Continued)

(58) Field of Classification Search
CPC ......... B65G 43/10; B65G 47/31; B65G 43/08
(Continued)

(56) References Cited

U.S. PATENT DOCUMENTS 6,023,034 A    2/2000 Nakajima et al.
2006/0157319 A1    7/2006 Sato

FOREIGN PATENT DOCUMENTS

JP    2002-29647    1/2002

OTHER PUBLICATIONS

Extended European Search Report issued Aug. 3, 2016 in Patent Application No. 16159176.3.

*Primary Examiner* — Gene Crawford
*Assistant Examiner* — Lester Rushin
(74) *Attorney, Agent, or Firm* — Oblon, McClelland, Maier & Neustadt, L.L.P.

(57) ABSTRACT

A conveying apparatus includes a conveying portion configured to convey conveyed items at a predetermined speed, a speed adjustment portion arranged midway in the conveying portion, the speed adjustment portion being configured to adjust the conveying speed of the conveyed items, a thickness detector arranged further upstream in conveying direction than the speed adjustment portion, the thickness detector being configured to detect a thickness of the conveyed items; a gap detector arranged further upstream in conveying direction than the speed adjustment portion of the conveying portion, the gap detector being configured to detect a preceding gap between a conveyed item and the conveyed item that is conveyed immediately in front of that conveyed item and a following gap between that conveyed item and the conveyed item that is conveyed immediately behind that conveyed item; and a control device configured to control the adjustment speed of the conveyed item by the speed adjustment portion. The control device is configured to decide a correction distance based on the thickness of the conveyed item detected by the thickness detector, to determine a corrected preceding gap by adding this correction distance to the preceding gap detected by the gap detector, to determine a corrected following gap by subtracting this correction distance from the following gap detected by the gap detector, and to decide the adjustment speed based on the corrected preceding gap and the corrected following gap.

6 Claims, 14 Drawing Sheets

(51) Int. Cl.
    *B65H 29/12*     (2006.01)
    *B65H 43/00*     (2006.01)
    *B65G 43/08*     (2006.01)
    *B65G 43/10*     (2006.01)
    *G01B 11/06*     (2006.01)
    *G01B 11/14*     (2006.01)

(52) U.S. Cl.
    CPC ......... *B65H 43/00* (2013.01); *G01B 11/0691* (2013.01); *G01B 11/14* (2013.01); *B65H 2301/4452* (2013.01); *B65H 2511/11* (2013.01); *B65H 2511/13* (2013.01); *B65H 2511/22* (2013.01); *B65H 2513/11* (2013.01); *B65H 2701/1311* (2013.01); *B65H 2701/1313* (2013.01); *B65H 2701/1916* (2013.01)

(58) Field of Classification Search
    USPC .......................................... 198/460.1, 502.2
    See application file for complete search history.

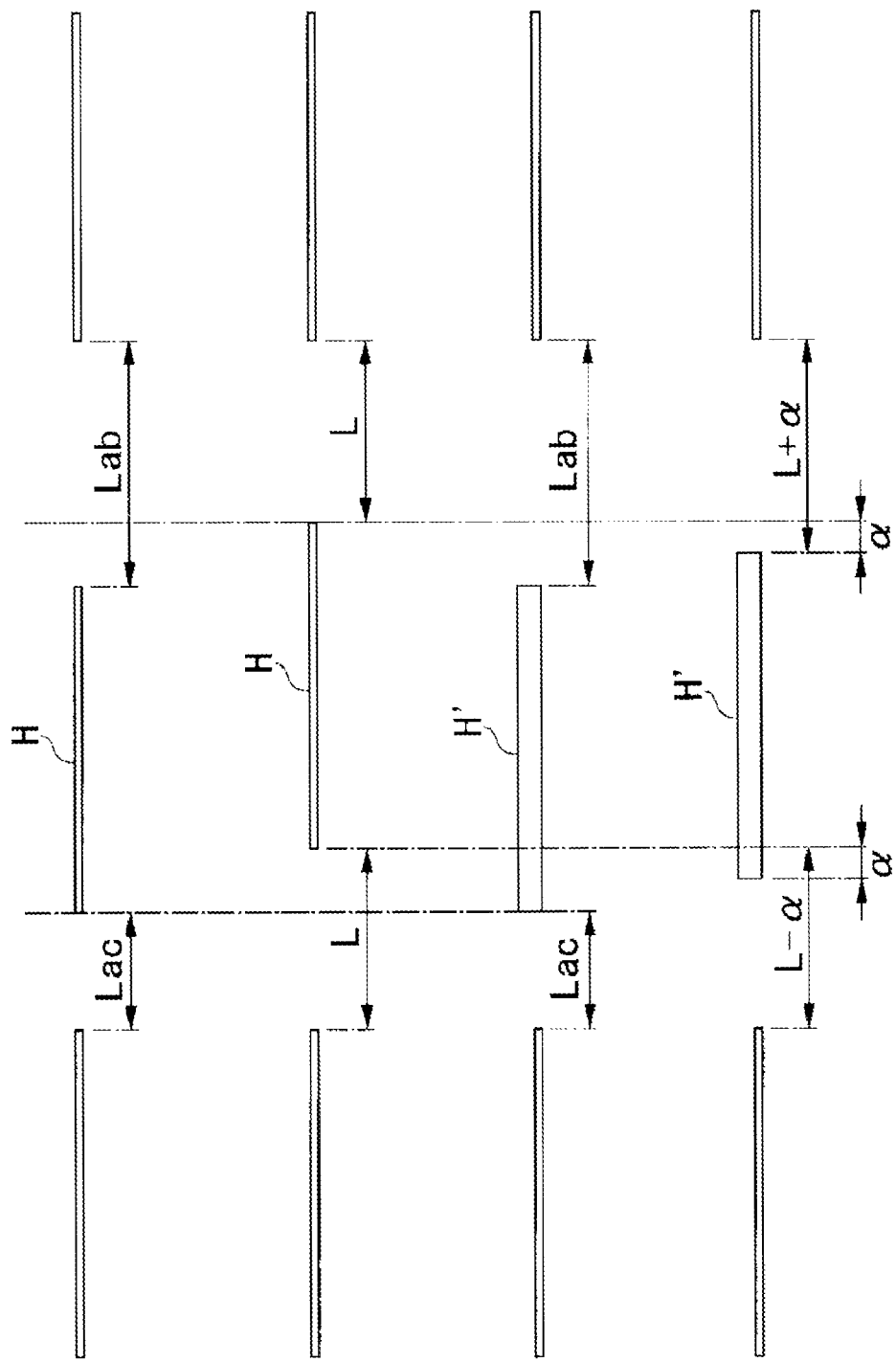

| PRECEDING GAP - FOLLOWING GAP (mm) | | | ... | | |
|---|---|---|---|---|---|
| ANTICIPATED ADJUSTMENT SPEED (m/s) | | | ... | | |

| THICKNESS (mm) | | | ..... | | |
|---|---|---|---|---|---|
| CORRECTION SPEED (m/s) | | | ..... | | |

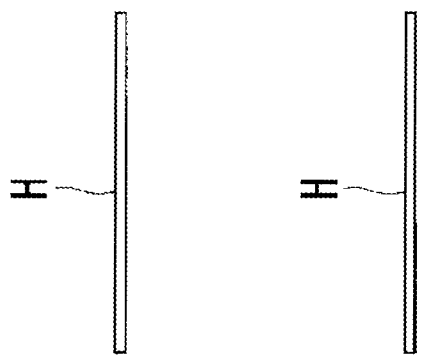
FIG. 10A
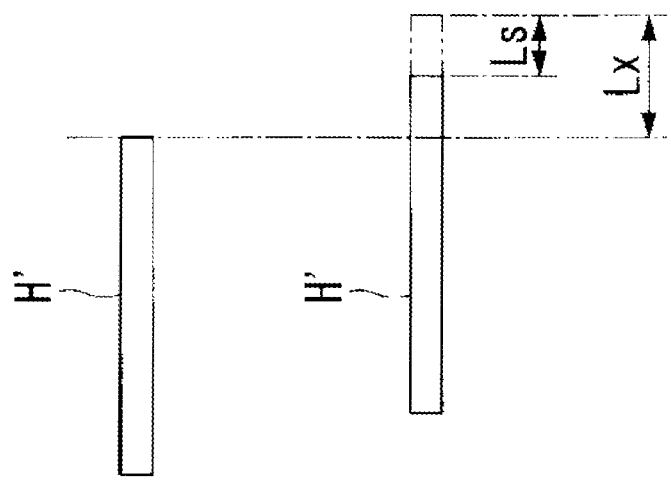
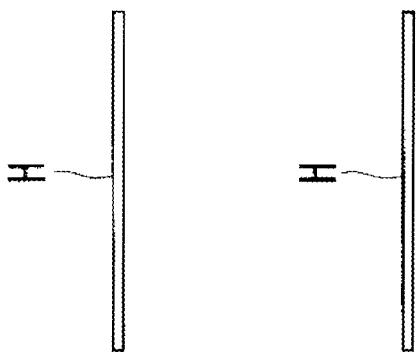
FIG. 10B

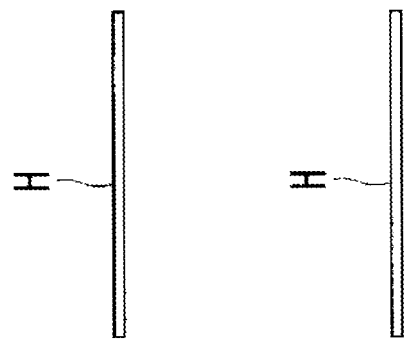
FIG. 11A
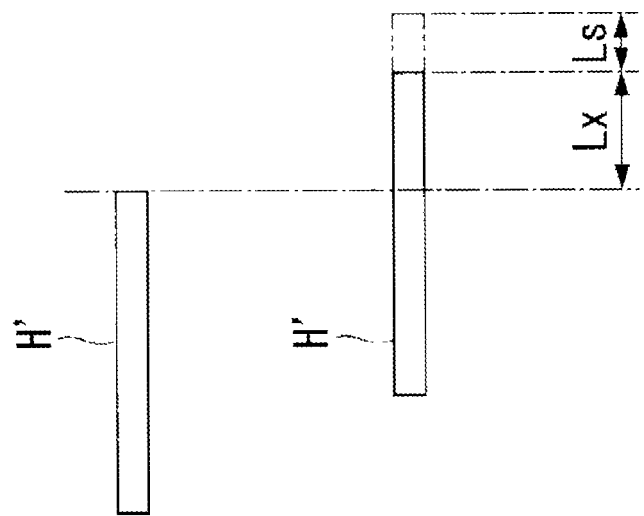
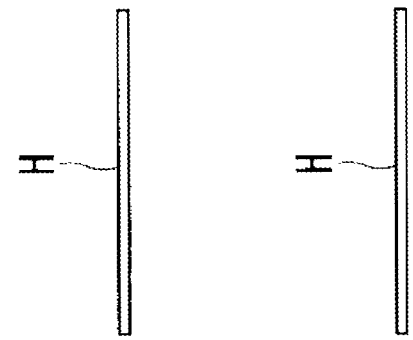
FIG. 11B

US 9,586,766 B2

CONVEYING APPARATUS

CROSS-REFERENCE TO RELATED APPLICATION

This application is based upon and claims the benefit of priority from Japanese Patent Application No. 2015-049499, filed on Mar. 12, 2015, the entire contents of which are incorporated herein by reference.

FIELD

Embodiments described herein relate generally to a conveying apparatus.

BACKGROUND

Conventionally, conveying apparatuses are known that sort conveyed items such as postal items or the like according to a predetermined classification. This type of conveying apparatus separates and takes out the conveyed items one by one from a take-out portion, conveys them spaced apart from one another with a conveyor belt or the like, and collects them in a collecting portion. Here, there are individual differences among the conveyed items, so that the conveying speed of each item may change depending on these individual differences. When the conveying speed changes in this way, the spacing between conveyed items may become too wide or too narrow. Thus, there is the possibility that during the operation of sorting or collecting the conveyed items, problems occur and a stable collection cannot be achieved.

For this reason, a gap correction device for adjusting the conveying speed of the conveyed items is provided midway in the conveyance of the conveyed items. By adjusting the conveying speed of the conveyed items with this gap correction device, the gap (referred to as "preceding gap" in the following") between a conveyed item whose gaps are to be corrected (also referred to as "conveyed item subject to correction" in the following) and the conveyed item that is conveyed immediately in front of that conveyed item subject to correction (referred to as "preceding conveyed item" in the following) can be corrected. Moreover, the gap (referred to as "following gap" in the following") between the conveyed item subject to correction and the conveyed item that is conveyed immediately behind that conveyed item subject to correction (referred to as "following conveyed item" in the following) can be corrected. Here, the adjustment of the conveying speed with the gap correction device is decided based on the difference between the preceding gap and the following gap. Thus, the preceding gap and the following gap of the conveyed item subject to correction that has passed the gap correction device can be kept within a predetermined range.

However, in practice, also the conveying speed of the conveyed items subject to correction varies when they pass the gap correction device, so that it may be difficult to keep the preceding gap and the following gap of the conveyed item subject to correction that has passed the gap correction device within the predetermined range. That is to say, when the thickness of the conveyed items is large, for example, then the adjustment speed is lower than in the case of thin conveyed items. Therefore, for conveyed items of different thicknesses, it may be difficult to correct the preceding gaps and the following gaps of all conveyed items with high precision.

BRIEF DESCRIPTION OF THE DRAWINGS

FIG. 3A shows a correction table, and FIG. 3B shows a adjustment speed table;

FIGS. 4A to 4D are diagrams showing the correction distance in the first embodiment, comparing the preceding gap and the following gap under different conditions;

FIG. 6A and FIG. 6B are diagrams showing the two tables in a first modification; FIG. 6A shows an anticipated adjustment speed table, and FIG. 6B shows a correction table;

FIG. 10A and FIG. 10B are diagrams of the characteristic error of the conveyed items in the third embodiment, showing the preceding gap under different conditions;

FIG. 11A and FIG. 11B are diagrams of the characteristic error of the conveyed items in the third embodiment, showing the preceding gap under different conditions;

DETAILED DESCRIPTION

Figure 1:
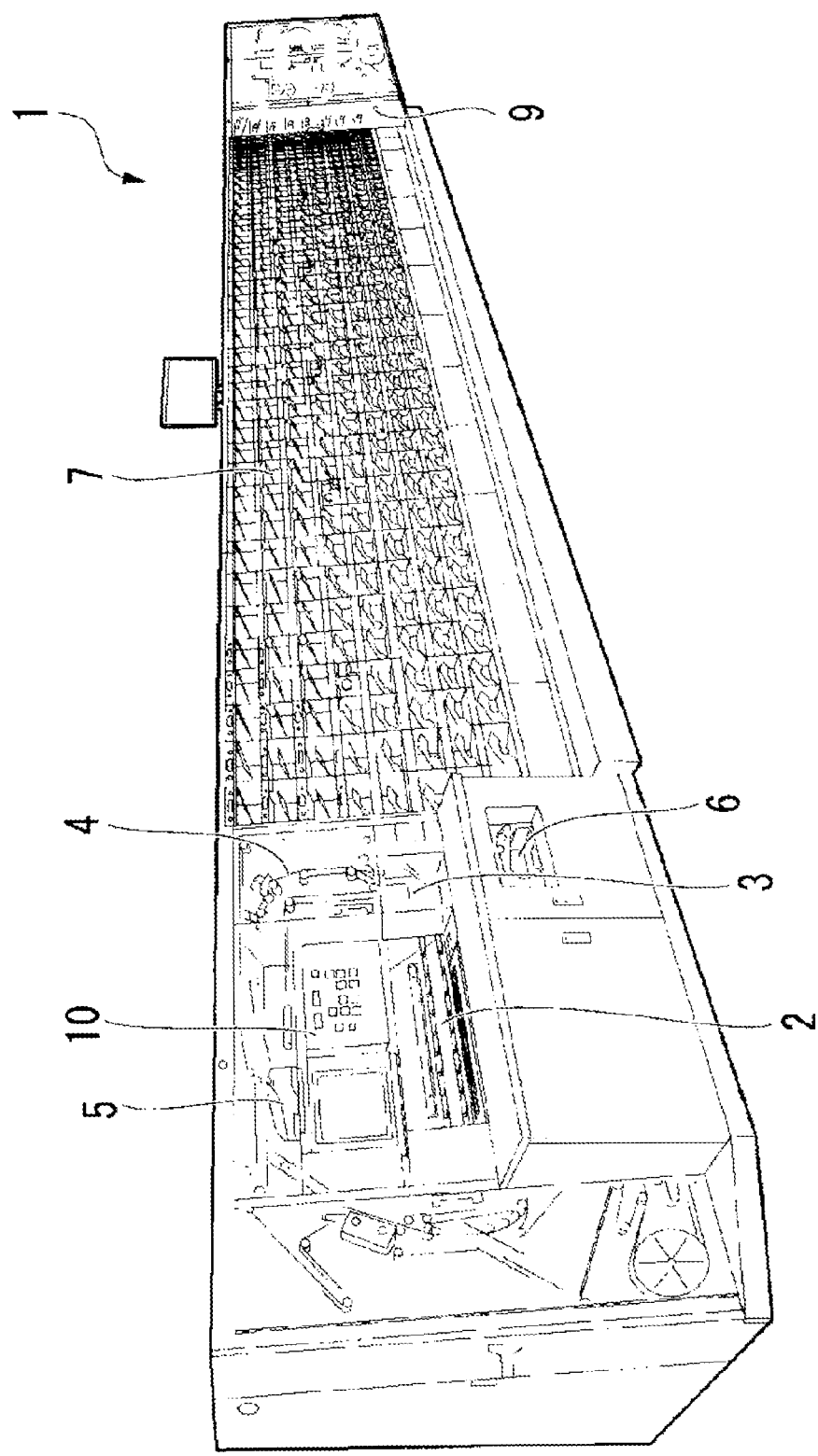
FIG. 1 is a perspective view of the configuration of a conveying device according to one embodiment.

According to one embodiment, there is provided a conveying apparatus including: a conveying portion configured to convey conveyed items at a predetermined speed; a speed adjustment portion arranged midway in the conveying portion, the speed adjustment being configured to adjust the conveying speed of the conveyed items; a thickness detector arranged further upstream in conveying direction than the speed adjustment portion, the thickness detector being configured to detect a thickness of the conveyed item; a gap detector arranged further upstream in conveying direction than the speed adjustment portion, the gap detector being configured to detect a preceding gap between a conveyed item and the conveyed item that is conveyed immediately in front of that conveyed item and a following gap between that conveyed item and the conveyed item that is conveyed immediately behind that conveyed item; and a control device configured to control the adjustment speed of the conveyed item by the speed adjustment portion; wherein the control device is configured to decide a correction distance based on the thickness of the conveyed item detected by the thickness detector, to determine a corrected preceding gap by adding this correction distance to the preceding gap detected by the gap detector, to determine a corrected following gap by subtracting this correction distance from the following gap detected by the gap detector, and to decide the adjustment speed based on the corrected preceding gap and the corrected following gap.

Referring to the drawings, the following is an explanation of a conveying apparatus according to one embodiment.

First Embodiment

FIG. 1 is a perspective view showing the configuration of a conveying apparatus 1. As shown in FIG. 1, this conveying apparatus 1 is for conveying postal matters, which can be e.g. sheet-shaped, and includes a supply portion 2, a take-out portion 3, a conveying portion 4, a first eliminating/collecting portion 5, a second eliminating/collecting portion 6, a sorting/collecting portion 7, a gap correcting portion 9 and a control device 10.

The supply portion 2 holds a plurality of conveyed items gathered by an operator, and stacked in a predetermined orientation. The supply portion 2 supplies the plurality of conveyed items to the take-out portion 3, which is located at its front end in the stacking direction, by moving the conveyed items in the stacking direction. The conveyed items may include items such as postcards and letters, but also flat items of a certain thickness, such as mail envelopes. The conveyed items have sorting information written or printed onto a first surface.

The take-out portion 3 takes out the conveyed items that are supplied by the supply portion 2 and located at the front-most end in the stacking direction one by one and feeds them to the conveying portion 4 located in take-out direction. The conveying portion 4 is constituted by a plurality of conveying belts 4a and a plurality of conveying rollers 18 (both shown in FIG. 2). Moreover, by driving the conveying belts 4a, it conveys the conveyed items in the direction in which the conveying belts 4a are laid out.

The first eliminating/collecting portion 5 and the second eliminating/collecting portion 6 are provided in the conveying portion 4. The first eliminating/collecting portion 5 and the second eliminating/collecting portion 6 collect any conveyed items to be eliminated out of the plurality of conveyed items taken out by the take-out portion 3. The first eliminating/collecting portion 5 detects conveyed items whose thickness exceeds a predetermined thickness as well as conveyed items containing foreign matter and collects/recovers such detected conveyed items. The second eliminating/collecting portion 6 detects conveyed items whose conveying orientation deviates from a predetermined orientation and collects/recovers such detected conveyed items.

The sorting/collecting portion 7 is connected via a conveying path (not shown) or the like to the gap correcting portion 9. The sorting/collecting portion 7 obtains sorting information that is provided to the conveyed items. The sorting/collecting portion 7 sorts and collects conveyed items in accordance with the sorting information obtained from the conveyed items.

The gap correcting portion 9 is arranged at the end (downstream end) of the conveying portion 4 opposite to the conveying direction. The gap correcting portion 9 detects the gaps preceding and following a conveyed item before and after the conveyed item in the conveying direction and sets the conveying speed of the conveyed item such that the detected gaps are values within a predetermined range (i.e. it performs a gap correction). The output end (downstream end) of the gap correcting portion 9 is connected to the sorting/collecting portion 7 by a downstream conveying portion 14 (see FIG. 2).

It should be noted that the configuration of the downstream conveying portion 14 is basically the same as the configuration of the conveying portion 4. That is to say, the downstream conveying portion 14 is constituted by a plurality of conveying belts 14a and a plurality of conveying rollers 19 (both shown in FIG. 2). Moreover, by driving the conveying belts 14a, the conveyed items are conveyed along the direction in which the conveying belts 14a are laid out. Moreover, the conveying speeds of the conveying portion 4 and the downstream conveying portion 14 are set to the same speed (referred to as "regular speed" or "predetermined speed" in the following).

Figure 2:
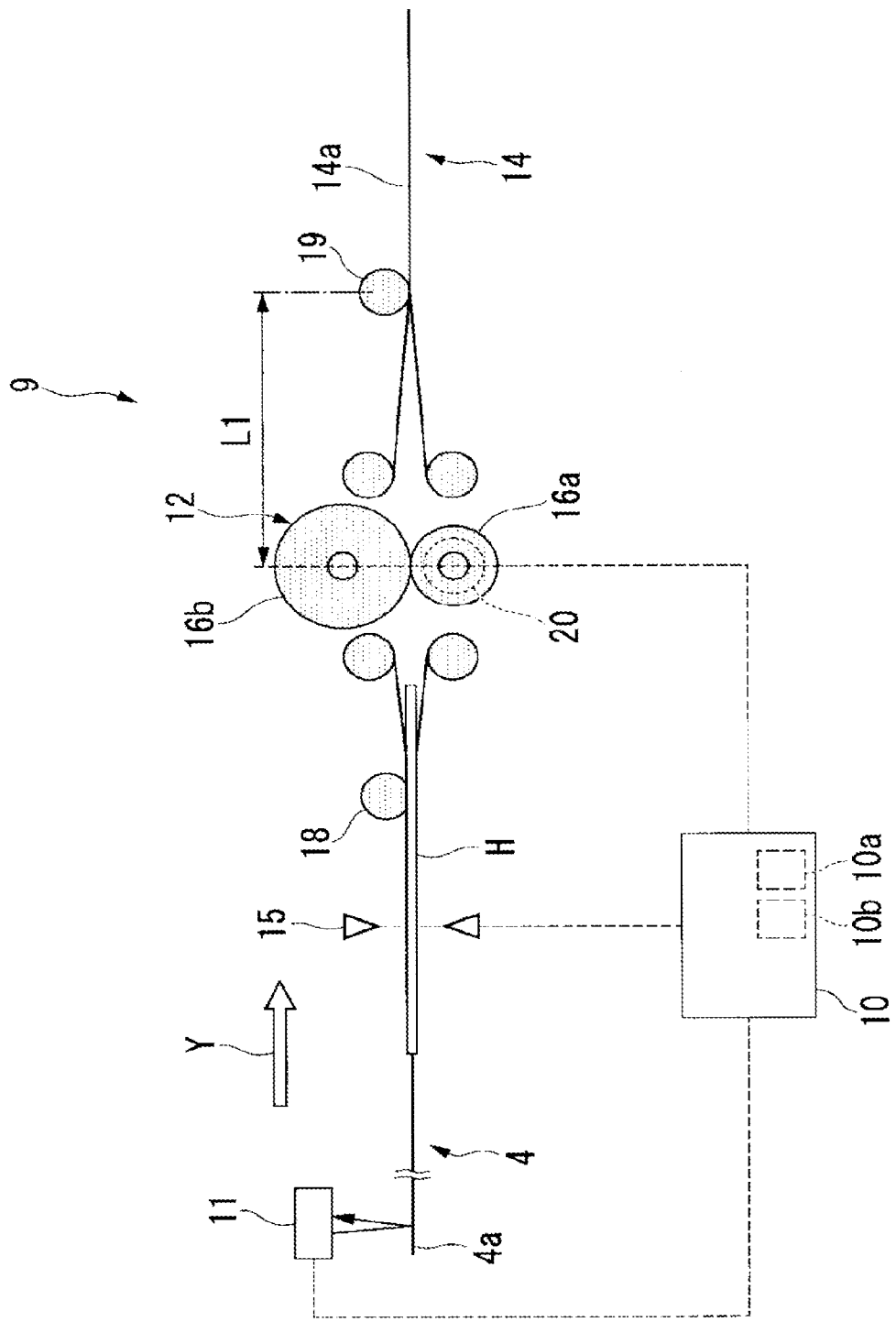
FIG. 2 is a schematic diagram showing the gap correction portion according to a first embodiment.

Referring to FIG. 2, the following is a detailed explanation of the gap correcting portion 9. FIG. 2 is a schematic diagram showing the gap correction portion 9. As shown in FIG. 2, the gap correction portion 9 is mainly constituted by a thickness detector 11 that detects the thickness of a conveyed item H, a gap detector 15 that detects the gap preceding and the gap following the conveyed item H, a speed adjusting portion 12 that adjusts the speed of the conveyed item H.

The thickness detector 11 is arranged midway in the conveying portion 4, and is constituted e.g. by a reflective optoelectronic sensor or the like. The result of detecting the thickness of the conveyed item H with the thickness detector 11 is output as a signal to the control device 10. The gap detector 15 is arranged midway in the conveying portion 4 and downstream from the thickness detector 11 and is constituted e.g. by a transmissive optoelectronic sensor or the like. In addition to the gaps preceding and following the conveyed item H, the gap detector 15 detects the length of the conveyed item H in the conveying direction Y (also referred to simply as the "length of the conveyed item H" below). These detection results are output as signals to the control device 10.

The speed adjusting portion 12 is arranged as a pair of a driving roller 16a and a driven roller 16b. The conveyed items H is conveyed to the downstream conveying portion 14 while being clamped between the driving roller 16a and the driven roller 16b.

The driving roller 16a is made of a hard rubber material, for example. A driving motor 20 is coupled to the driving roller 16a. The driving motor 20a drives the driving roller 16a based on output signals from the control device 10. Thus, the conveying speed of the conveyed item H that is conveyed by the speed adjusting portion 12 is accelerated or decelerated relative to the conveying speed of the conveying portion 4 or the downstream conveying portion 14 (in the following explanations, an acceleration or deceleration relative to the conveying speed (regular speed) is simply referred to as "acceleration" or "deceleration"), adjusting the gaps preceding and following the conveyed item H subject to correction.

On the other hand, the driven roller 16b is constituted by an elastically deformable material, such as sponge or the like, and its outer diameter is set to be larger than that of the driving roller 16a. The outer circumferential surface of the driven roller 16b is arranged to come in contact with the outer circumferential surface of the driving roller 16a. By configuring the driven roller 16b in this manner, the conveyed items H can be clamped reliably by the two rollers 16a and 16b, even if conveyed items H of different thickness are conveyed by the speed adjusting portion 12, and no excessive stress will be exerted on the conveyed items H.

That is to say, if a conveyed items H is thick, the driven roller 16b will elastically deform in accordance with its thickness, so that it can be prevented that an excessive stress is exerted on that conveyed item H.

The driving roller 16a and the driven roller 16b that are configured this way are arranged such that their outer circumferential surfaces at the location where they come in contact with each other are positioned in the direction in which the conveying belts 4a of the conveying portion 4 and the conveying belts 14a of the downstream conveying portion 14 are laid out (conveying direction).

Based on the output signal of the thickness detector 11 and the output signal of the gap detector 15, the control device 10 controls the driving of the speed adjusting portion 12 and adjusts the gaps of the corresponding conveyed items H (conveyed items H subject to correction). Moreover, the control device 10 includes two tables 10a and 10b. Referring to these two tables 10a and 10b the control device 10 controls the driving of the speed adjusting portion 12 and conveys the conveyed items H subject to correction at the desired adjustment speed.

It should be noted that with the speed adjusting portion 12, according to the present embodiment, the acceleration/deceleration time is set to be constant, and the preceding and following gaps are corrected by changing the acceleration or deceleration (for more details, refer to the explanation of the operation of the gap correction portion 9 below). However, there is no limitation to this, and it is also possible to configure the speed adjusting portion 12 such that it changes the acceleration/deceleration time in accordance with the gaps preceding or following the conveyed item.

Figure 3A:
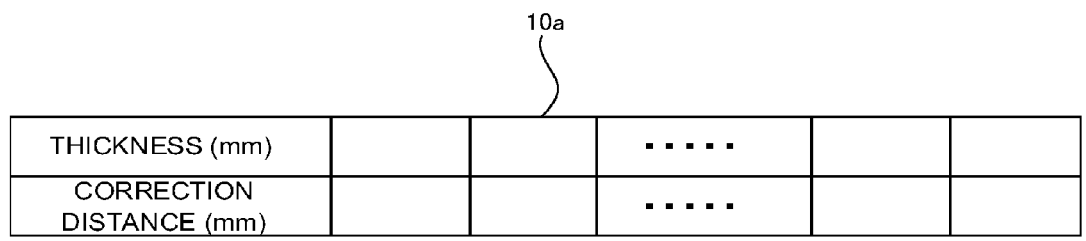
FIGS. 3A and 3B are diagrams showing two tables of the first embodiment.
Figure 3B:
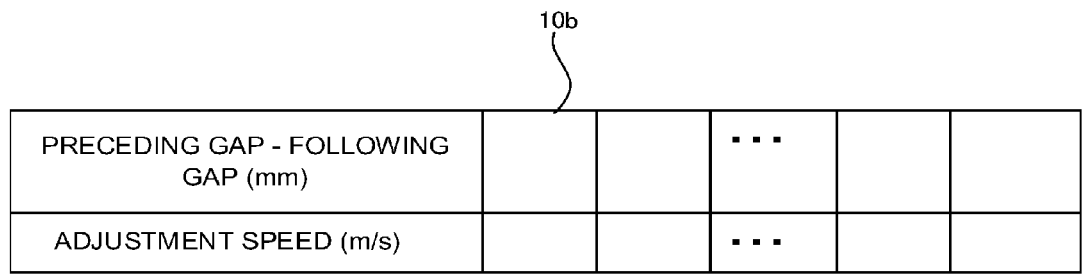

FIGS. 3A and 3B are diagrams showing the two tables 10a and 10b. FIG. 3A shows the correction table 10a, and FIG. 3B shows the adjustment speed table 10b. As shown in FIG. 3A, of the two tables 10a and 10b, the correction table 10a is a table that associates thicknesses of the conveyed items H with correction distances. In the correction table 10a shown in FIG. 3A, the values of the thickness (mm) and the correction distance (mm) become successively larger from the left to the right. That is to say, the larger the thickness (mm) of the conveyed item H is, the larger the adjustment distance (mm) becomes. Similarly, in the adjustment speed table 10b shown in FIG. 3B, the values of "preceding gap−following gap (mm)" and the adjustment speed (m/s) become successively larger from the left to the right. That is to say, the larger the value of "preceding gap/following gap (mm)" is, the larger the adjustment speed (m/s) becomes.

The correction distance is explained to with reference to FIG. 4. FIG. 4 shows diagrams illustrating the correction distance, and FIGS. 4A to 4D are diagrams comparing the preceding gap and the following gap under different conditions. As shown in FIG. 4A, the preceding gap and the following gap that were detected by the gap detector 15 (i.e. the preceding gap and the following gap before the gap correction) are referred to as preceding gap Lab and following gap Lac, respectively.

As shown in FIG. 4B, after passing the gap detector 15, if the gap correction of the conveyed item H subject to correction has been carried out properly by the gap corrector 9, that is, if the gap correction of a conveyed item H subject to correction that is of a standard thickness (reference thickness) has been carried out, the preceding gap Lab and the following gap Lac are equal. This proper gap after the gap correction shall be referred to as "gap L".

Next, in the case of a conveyed item H' subject to correction that has a thickness larger than the standard thickness (in the following simply referred to as "thick conveyed item H' subject to correction") as shown in FIG. 4C, the detection result by the gap detector 15 is taken to be a preceding gap Lab and a following gap Lac, similar to FIG. 4A.

In this case, even if a gap correction is performed similarly to FIG. 4B with the gap correction portion 9, the conveying speed of the thick conveyed item H' subject to correction is actually slower than the desired adjustment speed. Therefore, as shown in FIG. 4D, the preceding gap after correction is the proper gap $L+\alpha$ (where a is the distance by which the gap correction is incomplete). On the other hand, the following gap after the correction is $L-\alpha$. The distance $\alpha$ by which the gap correction is incomplete clue to the thickness of the conveyed item is the correction distance. The correction distance for each of a number of different thicknesses is determined by actual measurements, and the resulting data is stored.

Here, the value of the correction distance $\alpha$ is not necessarily a positive value. That is to say, if the thickness of the conveyed item subject to correction is thinner than the standard thickness, then the actual conveying speed of this thin conveyed item subject to correction is higher than the desired adjustment speed. Therefore, the value of the correction distance $\alpha$ becomes negative. In this case, the preceding gap after correction in FIG. 4D becomes $L+(-\alpha)$, and the preceding gap is shorter and the following gap is longer than the proper gap L for which the gap has been corrected properly. Consequently, the correction distances in the adjustment table 10a are set for conveyed items that are thicker as well as for conveyed items that are thinner than the conveyed item H of standard thickness.

On the other hand, of the two tables 10a and 10b, the adjustment speed table 10b associates value obtained by subtracting the following gap from the preceding gap with adjustment speeds, as shown in FIG. 3B. The adjustment speed is the conveying speed of the conveyed item H subject to correction at the speed adjusting portion 12 that is determined in accordance with the difference between the preceding gap and the following gap.

That is to say, if the value obtained by subtracting the following gap from the preceding gap is negative, then the following gap is larger than the preceding gap, and the adjustment speed is slower than the regular speed. By contrast, if the value obtained by subtracting the following gap from the preceding gap is positive, then the following gap is smaller than the preceding gap, and the adjustment speed is faster than the regular speed. It should be noted that if the value obtained by subtracting the following gap from the preceding gap is "0", then the preceding gap and the following gap are the same. Therefore, no speed adjustment of the conveyed item H subject to correction by the speed adjustment portion 12 is necessary, and the adjustment speed stays the regular speed.

Here, if the thickness of the conveyed item is different from the standard thickness, the preceding gap and the following gap when deciding the adjustment speed of the speed adjustment portion 12 are decided by adding the correction distance $\alpha$, which is determined by looking it up in the correction table 10a, to the preceding gap and following gap detected by the gap detector 15. That is to say, the control device 10 references the correction table 10a based on the detection result from the thickness detector 11, and determines the correction thickness a. Moreover, this correction thickness a is added to the preceding gap detected by the gap detector 15 to determine the corrected preceding gap. Also, the correction thickness $\alpha$ is subtracted from the following gap detected by the gap detector 15 to determine the corrected following gap. Then, the control device 10 references the adjustment speed table 10b based on the corrected preceding gap and the corrected following gap and decides the adjustment speed. This is explained in detail in the following with reference to a flowchart.

Figure 5:
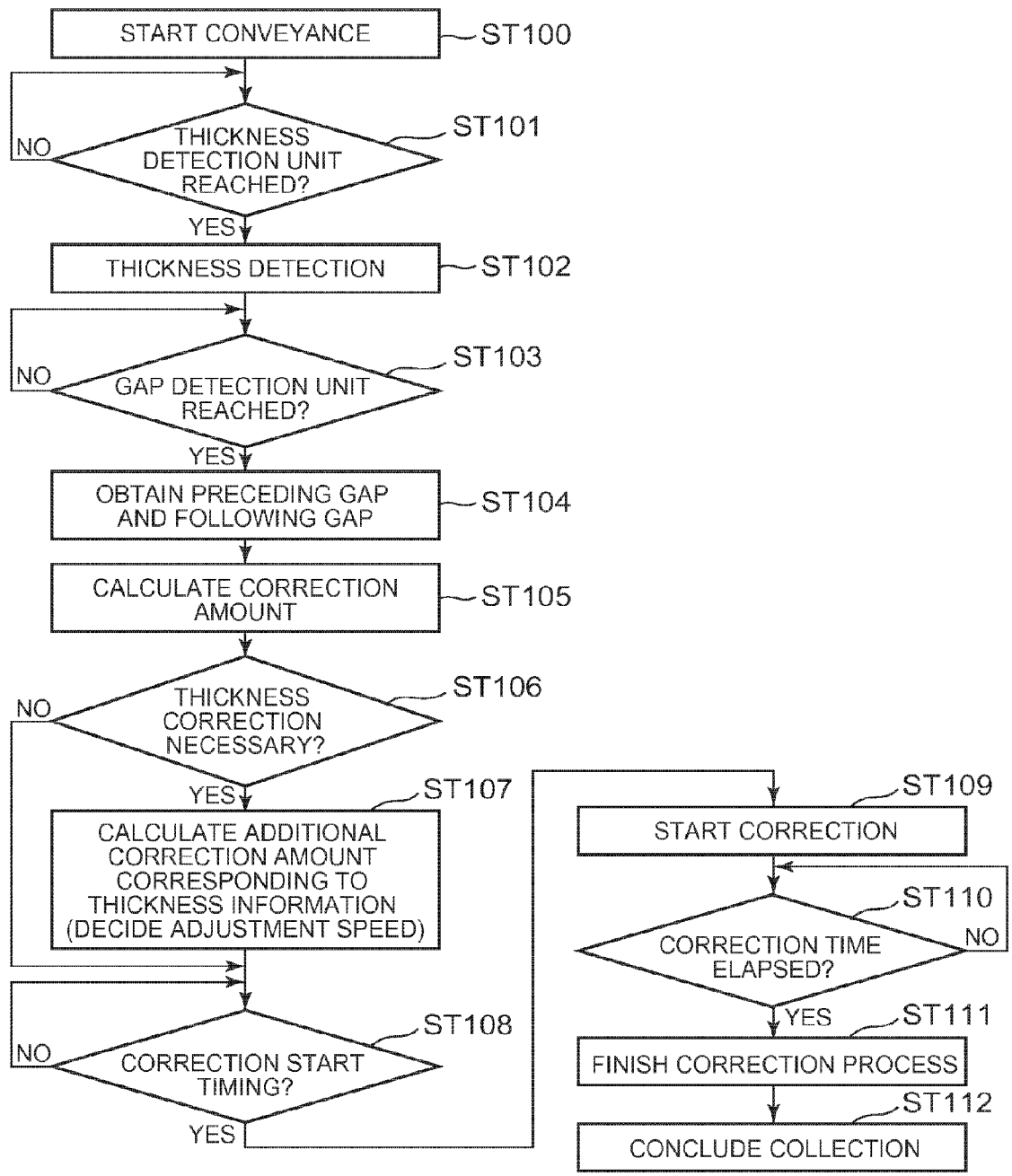
FIG. 5 is a flowchart illustrating a method for adjusting the preceding gap and the following gap of the conveyed item with the gap adjustment portion of the first embodiment.

FIG. 5 is a flowchart illustrating a method for adjusting the preceding gap and the following gap of the conveyed item H with the gap adjustment portion 9. As shown in FIG. 5, first of all, conveyed items are fed one by one via the supply portion 2 and the take-out portion 3 to the conveying portion 4 (Step ST 100). Then, the thickness detector 11 judges whether a conveyed item subject to correction has reached this thickness detector 11 (Step ST 101).

If the judgment at this Step ST 101 is "Yes", that is, if a conveyed item subject to correction has reached the thickness detector 11, then the thickness of the conveyed item subject to correction is detected by the thickness detector 11 (Step ST 102). The result of detecting the thickness is output as a signal to the control device 10. Then, the gap detector 15 judges whether the conveyed item subject to correction has reached the gap detector 15 (Step ST 103).

If the judgment at this Step ST 103 is "Yes", that is, if a conveyed item subject to correction has reached the gap detector 15, then the gap detector 15 detects the preceding gap and the following gap of the conveyed item subject to correction (Step ST 104). The result of detecting the preceding gap and the following gap is output as a signal to the control device 10.

Then, based on the preceding gap and the following gap detected by the gap detector 15, the control device 10 calculates the gap detection amount that is necessary in order to make the preceding gap and the following gap uniform (Step ST 105). Then, based on the thickness of the conveyed item subject to correction that has been detected by the thickness detector 11, the control device 10 judges whether the correction distance should be taken into account (Step ST 106).

If the judgment in Step ST 106 is "Yes," that is, if the thickness of the conveyed item subject to correction is not within the standard thickness and the correction distance should be taken into account, then the control device 10 references the correction table 10a in accordance with the thickness detected by the thickness detector 11. Then, it determines the correction distance. Furthermore, it determines the corrected preceding gap by adding the correction distance to the preceding gap detected by the gap detector 15. Moreover, it subtracts the correction distance from the following gap detected by the gap detector 15 and determines the corrected following gap. Then it references the adjustment speed table 10b based on the corrected preceding gap and the corrected following gap and decides the adjustment speed (Step ST 107).

Next, the control device 10 judges whether the correction start timing has come (Step ST 108). Here, "correction start timing" refers to the timing when a predetermined period of time has passed after the rearward edge of the conveyed item subject to correction has passed the gap detector 15. When this predetermined period of time has passed, the conveyed item subject to correction can be regarded as having reached the speed adjustment portion 12, and the speed adjustment portion 12 is driven in accordance with the above-noted adjustment speed. That is to say, the gap correction is started (Step ST 109). It should be noted that the timer for counting the predetermined time may be provided in any of the control device 10, the speed adjustment portion 12 and the gap detector 15.

On the other hand, if the judgment in Step ST 106 is "No", that is, if the thickness of the conveyed item subject to correction is within the standard thickness, then the control device 10 does not reflect the adjustment distance in the preceding gap and the following gap detected by the gap detector 15. That is to say, the control device 10 references the adjustment speed table 10b based on the preceding gap and the following gap and decides the adjustment speed. Then, the control device 10 judges whether the correction start timing has come (Step ST 108), and if the correction start timing has come, it drives the speed adjustment portion 12 and starts the gap correction (Step ST 109).

Then, it is judged whether a predetermined correction time has elapsed after starting to drive the speed adjustment portion 12 (after the start of the gap correction) (Step ST 110). If the judgment in Step ST 110 is "Yes", that is, if a predetermined correction time has elapsed, then the speed adjustment portion 12 returns to the regular speed and the gap correction operation is finished (Step ST 111).

Here, the predetermined correction time is set based on the time from when the front edge in conveying direction of the conveyed item subject to correction has reached the speed adjustment portion 12 until it reaches the downstream conveying portion 14. That is to say, the predetermined correction time can be determined by the distance L1 from the centers of the rollers 16a, 16b of the speed adjustment portion 12 to the center of a conveying roller 19 that is positioned furthest upstream in the downstream conveying portion 14.

In the present embodiment, the acceleration/deceleration time is set to be constant, so that if the adjustment speed is maximal, the distance that the conveyed item is moved should be slightly shorter than the distance L1. That is to say, the predetermined correction time is set such that the moving distance of the conveyed item in case of the maximum adjustment speed is slightly smaller than the distance L1. Thus, even in the case that the conveyed item bridges the speed adjustment portion 12 and the downstream conveying portion 14, there is no speed difference between the speed adjustment portion 12 and the downstream conveying portion 14. For this reason, a deterioration of the conveyed item due to this speed difference can be reliably averted.

The conveyed items for which the gap correction has been concluded are then collected via the downstream conveying portion 14 in the sorting/collecting portion 7 (Step ST 112).

Thus, the gap correction portion 9 of the above-described first embodiment is provided with a thickness detector 11, and decides the correction distance based on the thickness of the conveyed item detected by this thickness detector 11. Then, this correction distance is added to the preceding gap and the following gap detected by the gap detector 15 to determine the corrected preceding gap and the corrected following gap. Moreover, the actual adjustment speed of the speed adjustment portion 12 is set based on the corrected preceding gap and the corrected following gap. Therefore, the preceding gap and the following gap can be corrected with high precision, regardless of the thickness of the conveyed item.

Furthermore, the control device 10 includes a correction table 10a associating conveyed items with correction distances. Therefore, the adjustment distance can be quickly determined for any thickness of the conveyed item. Thus, it is possible to increase the processing speed of the gap correction portion 9.

It should be noted that in the foregoing first embodiment, it has been explained that the control device 10 includes two tables 10a, 10b, namely the correction table 10a and the adjustment speed table 10b, and the correction distance is determined by referencing the correction table 10a. Moreover, it has been explained that the adjustment speed table is referenced after reflecting the correction distance in the preceding gap and the following gap detected by the gap detector 15, and the actual adjustment speed with the speed adjustment portion 12 is decided. However, there is no limitation to this, and a configuration is also possible in which the correction speed is determined by referencing the correction table 10a. Moreover, a configuration is also possible in which the correction speed is added to the adjustment speed that is determined based on the preceding gap and the following gap detected by the gap detector 15.

This is explained in more detail with reference on FIG. 6A and FIG. 6B. FIG. 6A and FIG. 6B shows the configuration that the control device 10 has in a first modification. FIG. 6A shows an anticipated adjustment speed table 210a, and FIG. 6B shows a correction table 210b. As shown in FIG. 6A and FIG. 6B, the control device 10 in the first modification includes this anticipated adjustment speed table 210a (see FIG. 6A) and the correction table 210b (see FIG. 6B) instead of the correction table 10a and the adjustment speed table 10b of the first embodiment. The values of the "preceding gap–following gap (mm)" and the anticipated (preliminary) adjustment speed (m/s) in the anticipated adjustment speed table 210a shown in FIG. 6A become successively larger from the left to the right. That is to say, the larger the "preceding gap–following gap (mm)" is, the larger the anticipated adjustment speed (m/s) becomes. The thickness (mm) and the correction speed (m/s) in the correction table 210b shown in FIG. 6B also become successively larger from the left to the right. That is to say, the larger the thickness (mm) of a conveyed item H is, the larger the correction speed (m/s) becomes.

As shown in FIG. 6A, the anticipated adjustment speed table 210a associates values obtained by subtracting the following gap from the preceding gap with anticipated adjustment speeds. The anticipated adjustment speed is determined in accordance with the difference between the preceding gap and the following gap detected by the gap detector 15 and is the conveying speed that is anticipated for the conveyed item H subject to correction in the speed adjustment portion 12.

That is to say, if the value obtained by subtracting the following gap from the preceding gap is negative, then the following gap is larger than the preceding gap, and the anticipated adjustment speed is slower than the regular speed. By contrast, if the value obtained by subtracting the following gap from the preceding gap is positive, then the following gap is smaller than the preceding gap, and the anticipated adjustment speed is faster than the regular speed. It should be noted that if the value obtained by subtracting the following gap from the preceding gap is "0", then the preceding gap and the following gap are the same. Therefore, no speed adjustment of the conveyed item H subject to correction by the speed adjustment portion 12 is necessary, and the anticipated adjustment speed stays the regular speed.

On the other hand, as shown in FIG. 6B, the correction table 210b associates thicknesses (mm) of the conveyed items H with correction speeds (m/s). The correction speed (m/s) is the speed that is added to the anticipated adjustment speed (m/s) depending on the thickness (mm) of the conveyed item H. As the thickness (mm) of the conveyed items H in the correction table 210b increases, the correction speed (m/s) becomes faster. More specifically, a standard thickness (reference thickness) of the conveyed items H is set for the thickness (mm) of the conveyed items H, and if the thickness in the correction table 210b is thinner than that standard thickness, then the correction speed (m/s) becomes negative. On the other hand, if the thickness becomes thicker than the standard thickness, then the correction speed (m/s) becomes positive. Therefore, if the correction speed (m/s) is added to the anticipated adjustment speed (m/s), then the result is not necessarily faster than the anticipated adjustment speed (m/s), but may also be slower than the anticipated adjustment speed (m/s).

Based on this configuration, the control device 10 adds the correction speed determined by referencing the correction table 210b to the anticipated adjustment speed determined by referencing the anticipated adjustment speed table 210a. Thus, the determined value is decided as the adjustment speed. Then, the speed adjustment portion 12 is driven based on this adjustment speed. Consequently, with the above-described first modification, the same effect can be attained as with the previously described first embodiment.

Second Embodiment

Figure 7:
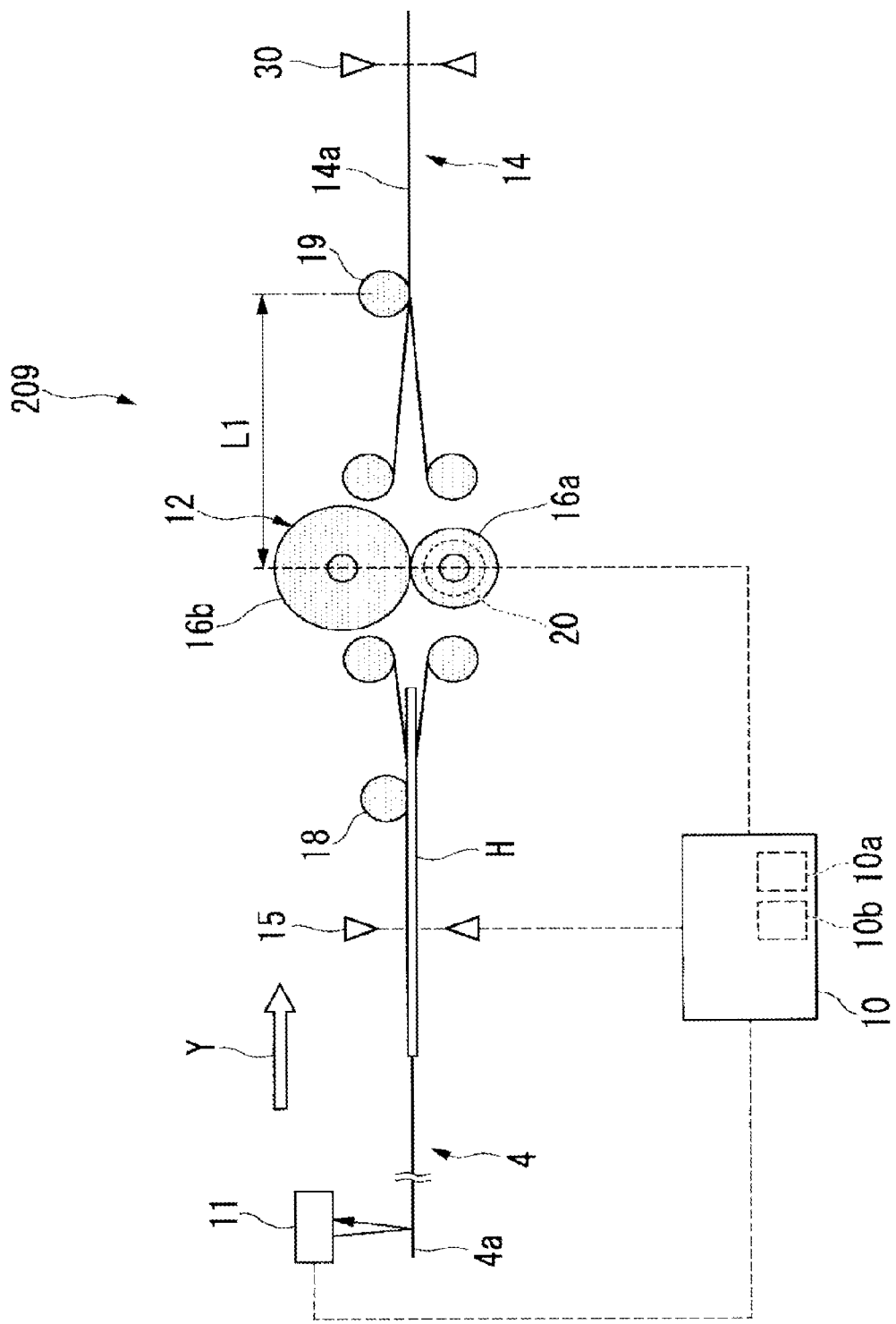
FIG. 7 is a schematic diagram showing a gap correction portion of a second embodiment.
Figure 8:
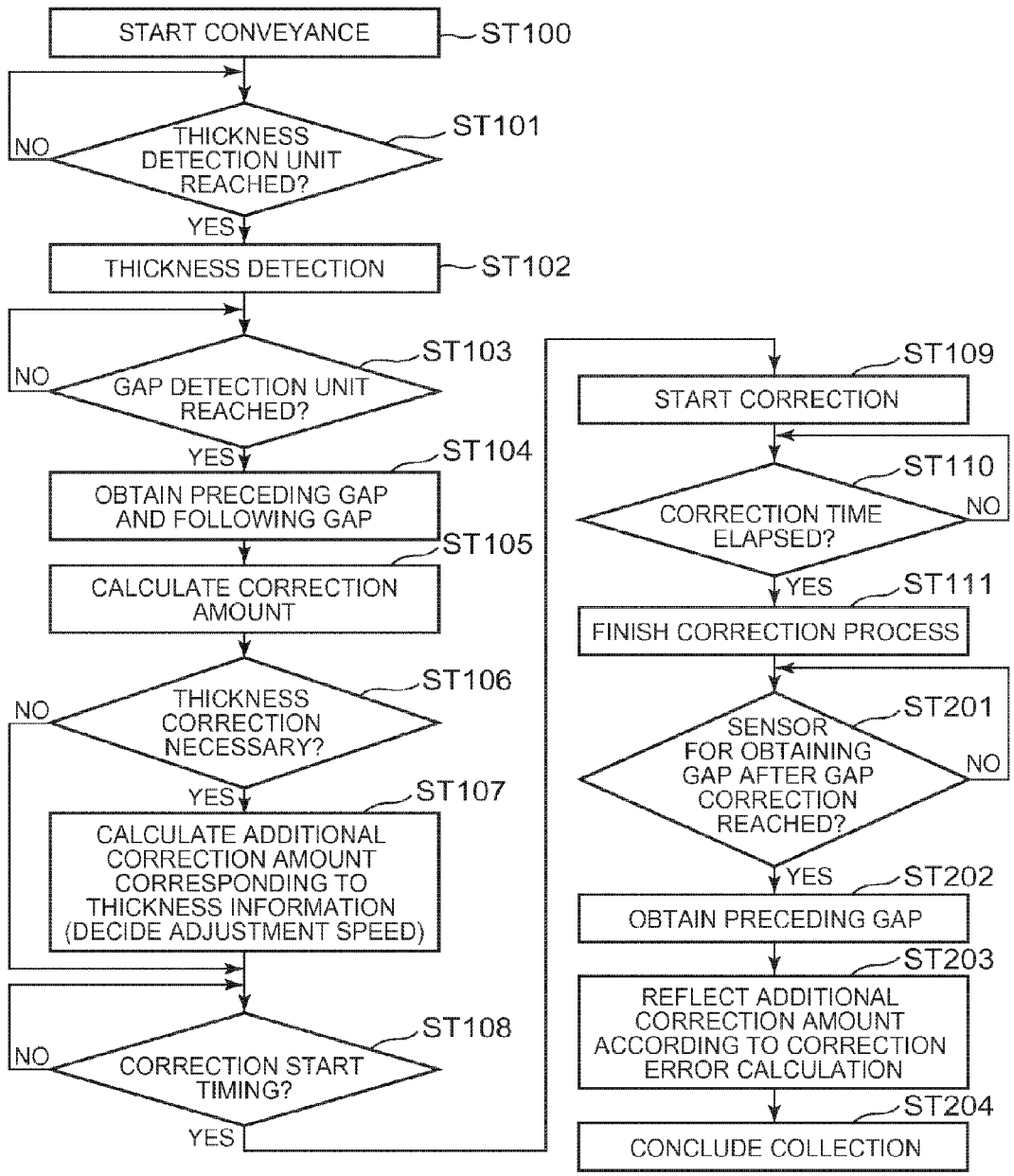
FIG. 8 is a flowchart showing a method for adjusting the preceding gap and the following gap of a conveyed item with the gap correction portion of the second embodiment.

Referring to FIG. 7 and FIG. 8, the following is an explanation of a second embodiment. FIG. 7 is a schematic diagram showing a gap correction portion 209. Aspects in FIG. 7 that are the same as those in the previously described first embodiment are given the same reference numerals and their further explanation is omitted (the same is also true for the following embodiments). As shown in FIG. 7, the gap correction portion 209 includes a correction result detecting portion 30 that is arranged midway in the downstream conveying portion 14. This aspect is different from the previously described first embodiment. The correction result detecting portion 30 detects the preceding gap of the conveyed item H subject to correction after it has passed the speed adjustment portion 12. The correction result detecting portion 30 may be constituted by a transmissive optoelectronic sensor or the like and is arranged as close as possible to the speed adjustment portion 12.

Based on this configuration, the gap correction portion 209 confirms with the correction result detector 30 whether the preceding gap of the conveyed item H that has passed the speed adjustment portion 12 and undergone gap correction is actually the desired gap. Since there is the possibility that the conveying speed changes not only due to the thickness but also due to other characteristic properties of the conveyed items, each conveyed item is detected by the correction result detector 30. Then, the detection result of the correction result detector 30 is taken as the characteristic error of that conveyed item (conveyed item characteristic error) and reflected in the adjustment speed the next time when the same conveyed item is conveyed. The following explains this in detail with reference to a flowchart.

FIG. 8 is a flowchart showing a method for adjusting the preceding gap and the following gap of a conveyed item H with the gap correction portion 209 of the second embodiment. Here, the first steps carried out by the gap correcting portion 209 are the same as in the previously described first embodiment. That is to say, the steps carried out by the gap correcting portion 209 up to Step ST 111 in FIG. 5 are the same as in the previously described first embodiment. Consequently, the reference numerals up to Step ST 111 in FIG. 8 are the same as in the previously described first embodiment (see FIG. 5), and their further explanation has been omitted.

After a predetermined period of time has elapsed and the speed adjustment portion 12 has returned to the regular speed, and the gap correcting portion 209 has finished the gap correction operation (Step ST 111), the correction result detector 30 judges whether a conveyed item subject to correction has reached the correction result detector 30 (Step ST 201).

If the judgment at Step ST 201 is "Yes", that is, if a conveyed item subject to correction has reached the correction result detector 30, then the preceding gap of the conveyed item subject to correction is detected by the correction result detector 30 (Step ST 202). The detection result of this preceding gap is output as a signal to the control device 10.

Then, based on the detection result of the correction result detector 30, the control device 10 corrects the adjustment speed for the corresponding thickness of conveyed items. That is to say, the adjustment speed is determined by referencing the correction table 10*a* (see FIG. 3A) and the adjustment speed table 10*b* (see FIG. 3B), but the detection result of the correction result detector 30 is additionally reflected in the determined adjustment speed (Step ST 203).

In the following, two examples are given on how the detection result can be reflected: In a first method, a correction speed is calculated based on the detection result of the correction result detector 30 and this correction speed is reflected in the adjustment speed. In a second method, a correction distance is calculated based on the detection result of the correction result detector 30 and added to the distance of the correction gap determined by the preceding gap and the following gap, thereby effectively adjusting the adjustment speed.

The conveyed items subject to correction for which the gap correction has been concluded are then collected via the downstream conveying portion 14 in the sorting/collecting portion 7 (Step ST 204).

It should be noted that there is no limitation to carrying out the operation of Step ST 203 every time the gap correction portion 209 is in operation. That is to say, a configuration is also possible in which the detection result of the correction result detector 30 is output as a signal to the control device 10. For example, a configuration is possible, in which a signal of the detection result of the correction result detector 30 is output to the control device 10 when the daily operation of the control device 1 is finished, and before starting the operation of the conveying apparatus 1 on the next day, this detection result is reflected in the adjustment speed.

Consequently, with this second embodiment, errors that are characteristic to the various conveyed items can be reflected in the adjustment speed of the speed adjustment portion 12. Therefore, the preceding gap and the following gap can be corrected with even higher precision than in the previously described first embodiment.

Third Embodiment

Figure 9:
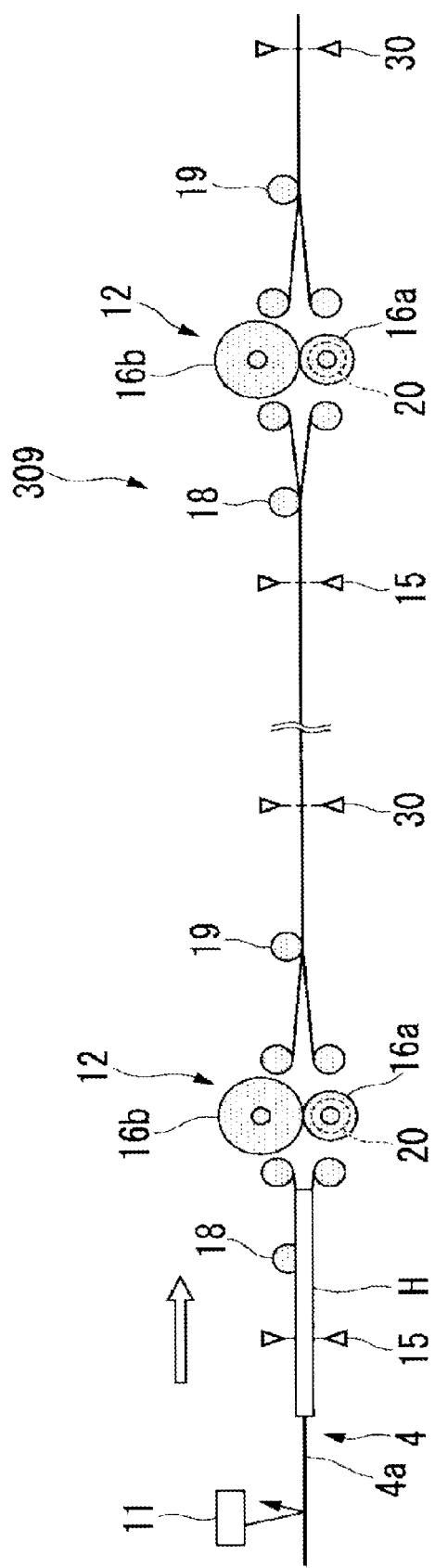
FIG. 9 is a schematic diagram showing a gap correction portion of a third embodiment.

Referring to FIGS. 9 to 12, the following is an explanation of the third embodiment. FIG. 9 is a schematic diagram showing a gap correction portion 309. As shown in FIG. 9, the gap correction portion 309 includes a plurality of speed adjustment portions 12, and a plurality of gap detectors 15 and correction result detectors 30 that are arranged in correspondence to the speed adjustment portions 12. The fact that the speed adjustment portions 12, the gap detectors 15 and the correction result detectors 30 are provided in plurality is what is different from the previously described first embodiment and second embodiment. It should be noted that in FIG. 9, for the sake of convenience, two each of the speed adjustment portions 12, the gap detectors 15 and the correction result detectors 30 are shown, and further aspects have been omitted from the drawings.

Here, the functionality of the speed adjustment portions 12, the gap detectors 15 and the correction result detectors 30 is the same as in the previously described first embodiment and second embodiment. However, the detection result of the correction result detectors 30 is reflected in the driving control of the speed adjustment portion 12 that is arranged immediately downstream of the respective correction result detector 30. This aspect is different from the previously described second embodiment.

The following is a more specific explanation of the role of the correction result detectors 30 in the third embodiment. For example, let us assume that a thick conveyed item H' subject to correction passes the speed adjustment portion 12 furthest upstream as shown in FIG. 10A, and the gap adjustment amount that would have been expected is Lx as shown in FIG. 10B, but there is a difference of Ls to the actual gap correction amount. This difference Ls might be caused by a change in the conveying speed due to characteristic properties other than the change in conveying speed due to the thickness of the conveyed item H' subject to correction (in the following, this difference Ls is also referred to as "characteristic difference Ls").

Therefore, in the speed adjustment portion 12 (the next speed adjustment portion 12) passed next by this conveyed item H' subject to correction, the characteristic difference Ls is further added to the preceding gap and the following gap detected by the gap detector 15 and the gap correction amount Lx determined from the thickness of the conveyed item H' subject to correction, as shown in FIG. 11A and FIG. 11B, and the adjustment speed of the speed adjustment portion 12 is decided. In the following, this explained in more detail with reference to a flowchart.

Figure 12:
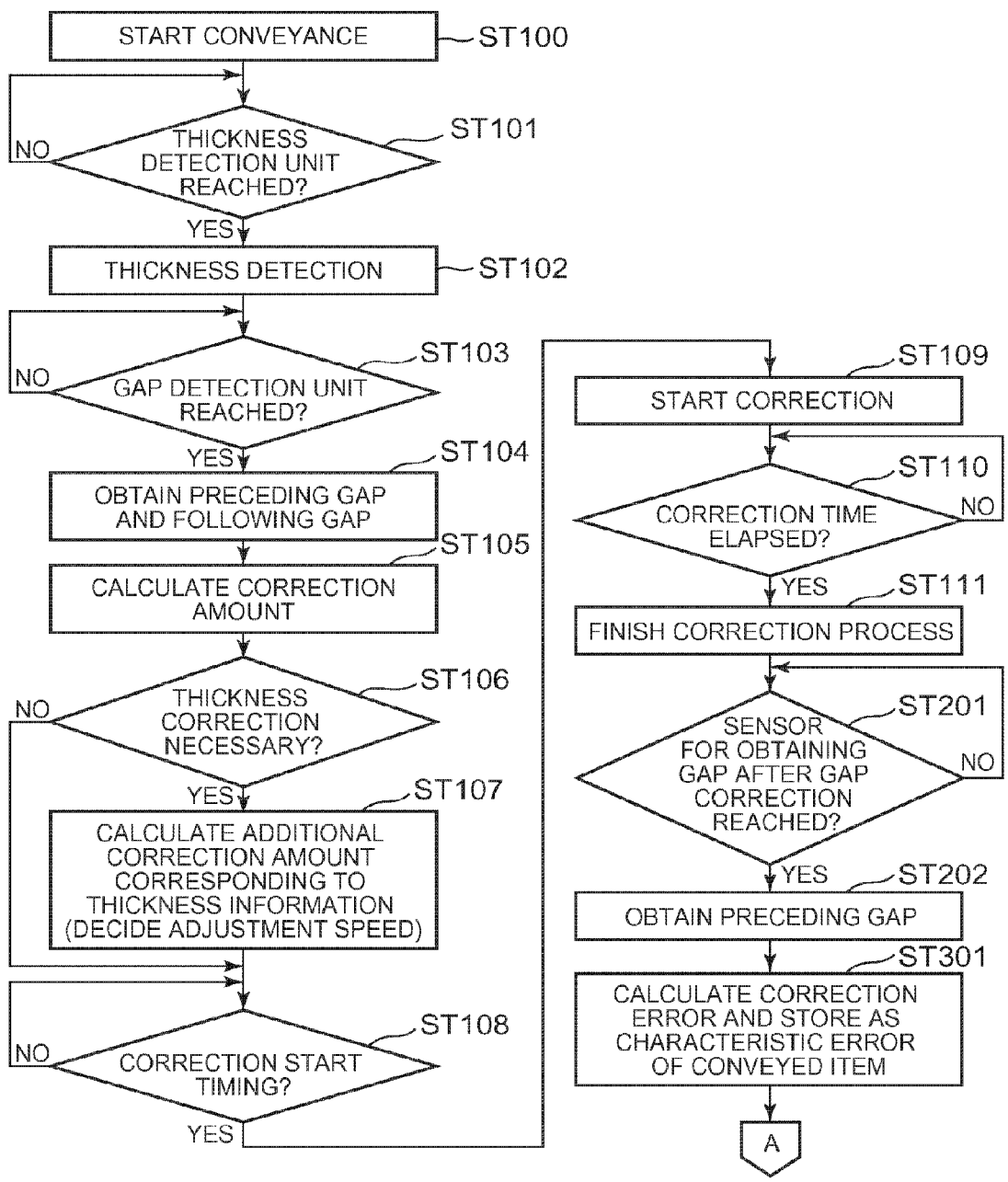
FIG. 12 is a flowchart of the method for adjusting the preceding gap and the following gap of the conveyed item with the gap correction portion according to the third embodiment.
Figure 13:
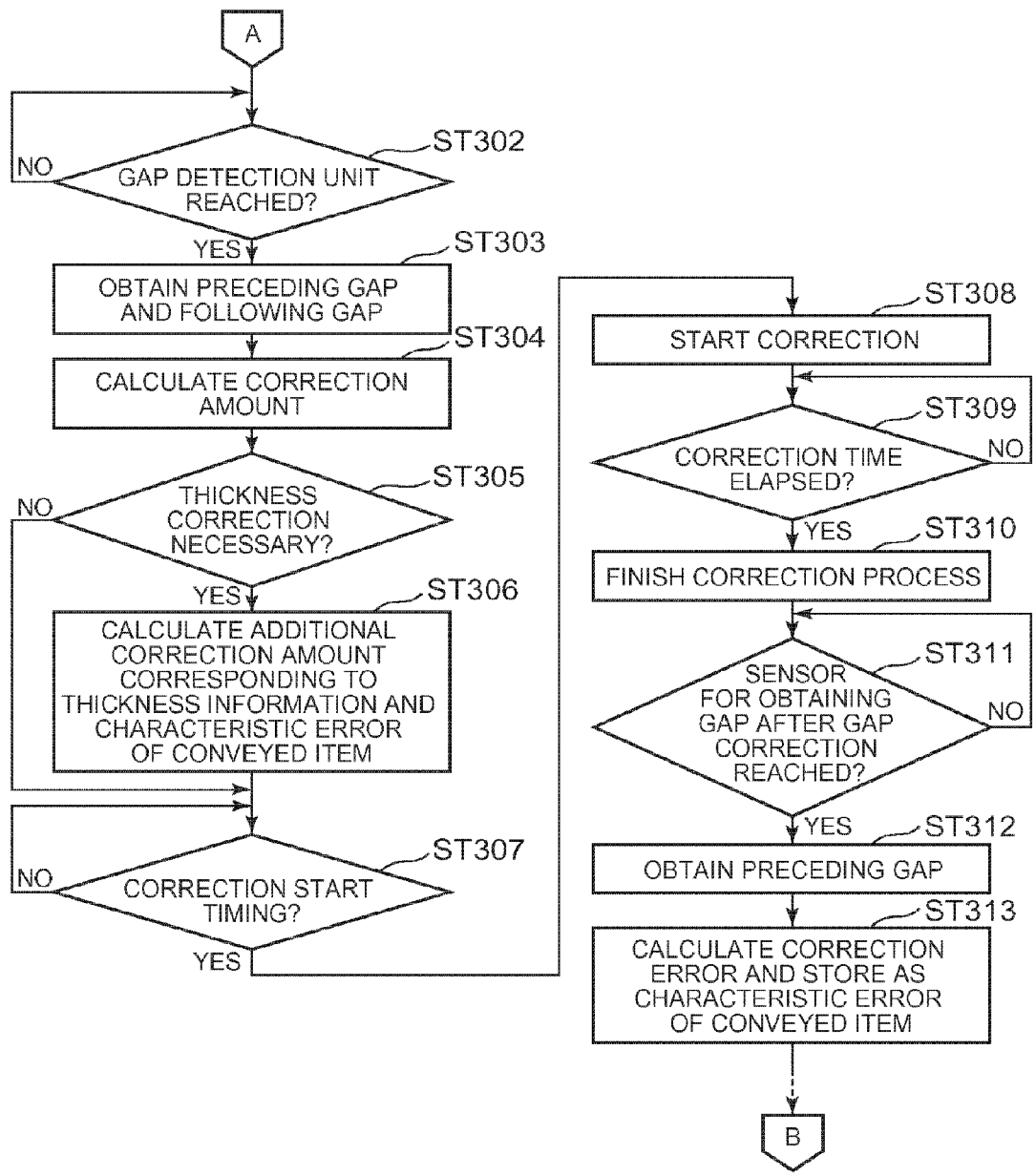
FIG. 13 is a flowchart of the method for adjusting the preceding gap and the following gap of the conveyed item with the gap correction portion according to the third embodiment.
Figure 14:
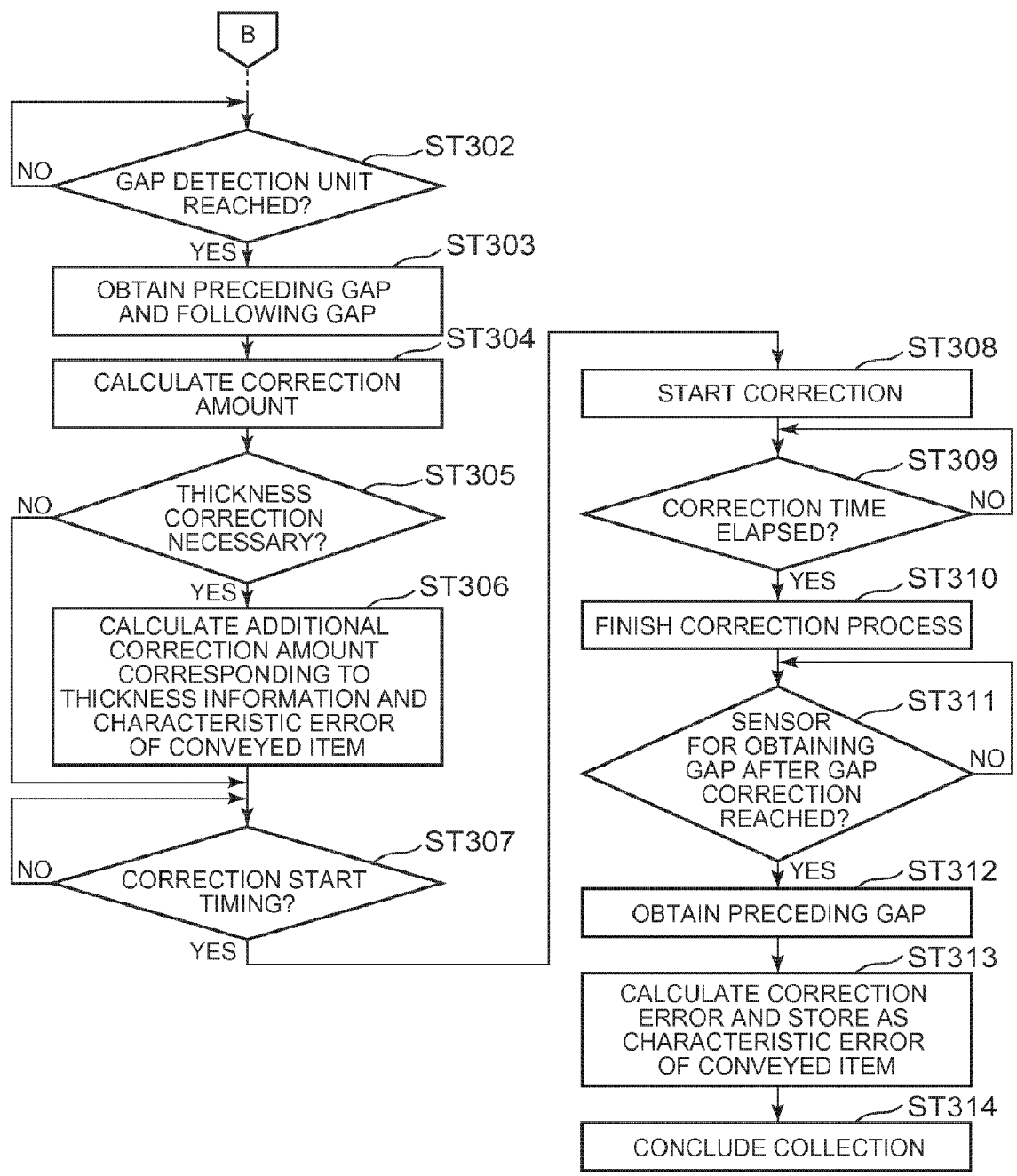
FIG. 14 is a flowchart of the method for adjusting the preceding gap and the following gap of the conveyed item with the gap correction portion according to the third embodiment.

FIGS. 12 to 14 show a flowchart of the method for adjusting the preceding gap and the following gap of the conveyed item H with the gap correction portion 309 according to the third embodiment. Here, the first steps carried out by the gap correcting portion 309 are the same as in the previously described second embodiment. That is to say, the steps carried out by the gap correcting portion 309 up to Step ST 203 in FIG. 8 are the same as in the previously described second embodiment. Consequently, the reference numerals up to Step ST 203 in FIGS. 12 to 14 are the same as in the previously described second embodiment (see FIG. 8), and their further explanation has been omitted.

With the gap correcting portion 309, when the preceding gap of the conveyed item subject to correction is detected by the correction result detector 30 (Step ST 202), this result of detecting the preceding gap is output as a signal to the control device 10. The control device 10 stores the result of the detection by the correction result detector 30 as a characteristic error of the corresponding conveyed item (characteristic difference Ls shown in FIGS. 10 and 11) in a memory not shown in the drawings (Step ST 301).

Subsequently, as shown in FIGS. 9 and 13, the conveyed item subject to correction is conveyed to the speed adjustment portion 12 (the second, immediately downstream) following the first speed adjustment portion 12. Then, the gap detector 15 arranged prior to the second speed adjustment portion 12 judges whether a conveyed item subject to correction has reached this gap detector 15 (Step ST 302). If the judgment in Step ST 302 is "Yes", that is, if a conveyed item has reached the gap detector 15, then the preceding gap and the following gap of the conveyed item subject to correction are detected by the gap detector 15 (Step ST 303).

The detection result of the preceding gap and the following gap is output as a signal to the control device 10.

Next, based on the preceding gap and the following gap detected by the gap detector 15, the control device 10 calculates the gap correction amount that is necessary in order to make the preceding gap and the following gap uniform (Step ST 304). Then, based on the thickness of the conveyed item subject to correction detected by the thickness detector 11, the control device 10 judges whether the correction distance should be taken into account (Step ST 305).

If the judgment in Step ST 305 is "Yes", that is, if the thickness of the conveyed item subject to correction is not within the standard thickness, and the correction distance should be taken into account, then the control device 10 references the correction table 10a in accordance with the thickness detected by the thickness detector 11. Then, it determines the correction distance. Furthermore, it adds this correction distance to the preceding gap detected by the gap detector 15, and adds the characteristic error of the conveyed item subject to correction that has previously been stored by the control device 10 to the preceding gap. Thus, the corrected preceding gap is determined. Moreover, it subtracts the correction distance from the following gap detected by the gap detector 15, and subtracts the characteristic error of the conveyed item subject to correction from the following gap. Thus, the corrected following gap is determined. Then it references the adjustment speed table 10b (see FIG. 3B) based on the corrected preceding gap and the corrected following gap and decides the adjustment speed (Step ST 306).

Next, the control device 10 judges whether the correction start timing has come (Step ST 307). When this predetermined period of time has passed, the conveyed item subject to correction can be regarded as having reached the speed adjustment portion 12, and the speed adjustment portion 12 is driven in accordance with the above-noted adjustment speed. That is to say, the gap correction is started (Step ST 308).

On the other hand, if the judgment in Step ST 305 is "No", that is, if the thickness of the conveyed item subject to correction is within the standard thickness, then the control device 10 does not reflect the adjustment distance in the preceding gap and the following gap detected by the gap detector 15. Then, the control device 10 references the adjustment speed table 10b based on the preceding gap and the following gap and decides the adjustment speed. Subsequently, the control device 10 judges whether the correction start timing has come (Step ST 307). If the correction start timing has come, it drives the speed adjustment portion 12 and starts the gap correction (Step ST 308).

Then, it is judged whether a predetermined correction time has elapsed after starting to drive the speed adjustment portion 12 (after the start of the gap correction) (Step ST 309). If the judgment in Step ST 309 is "Yes", that is, if a predetermined correction time has elapsed, then the speed adjustment portion 12 returns to the regular speed and the gap correction operation is finished (Step ST 310). Next, it is judged by the correction result detector 30 that is arranged immediately downstream from the second speed adjustment portion 12 whether the conveyed item subject to correction has reached that correction result detector 30 (Step ST 311).

If the judgment at Step ST 311 is "Yes," that is, if the conveyed item subject to correction has reached the correction result detector 30, then the correction result detector 30 detects the gap preceding the conveyed item subject to correction (Step ST 312). The result of detecting this preceding gap is output as a signal to the control device 10. The control device 10 stores the result of the detection by the correction result detector 30 as a characteristic error of the corresponding conveyed item in a memory not shown in the drawings (Step ST 313).

Then, this operation is repeated by the third, N-th speed adjustment portion 12, gap detector 15 and correction result detector 30 (see FIG. 14). Conveyed items subject to correction for which the gap correction by the N-th speed adjustment portion 12 has finished are then collected via the downstream conveying portion 14 in the sorting/collecting portion 7 (Step ST 314 in FIG. 14). It should be noted that in FIG. 14, the same steps as in FIG. 13 are given the same reference numerals and their explanation is not repeated.

Thus, in the above-described third embodiment, a plurality of speed adjustment portions 12, gap detectors 15 and correction result detectors 30 are provided. Then, the detection results of the correction result detectors 30 are taken as characteristic errors of the conveyed items, and these characteristic errors are reflected in the adjustment speed of the respective speed adjustment portions 12 that follow the correction result detectors 30 that have detected the characteristic errors. That is to say, the characteristic errors determined from the detection result of the first correction result detector 30 are reflected in the adjustment speed of the second speed adjustment portion 12. Therefore, the characteristic errors of the conveyed items can be reflected by the gap correction portion 309 and the preceding gap and the following gap can be corrected with even greater precision than with the previously described first embodiment.

It should be noted that the above-described third embodiment has been explained for the case that a plurality of speed adjustment portions 12, gap detectors 15 and correction result detectors 30 are provided. However, there is no limitation to this and it is sufficient if at least two of the speed adjustment portions 12 and the gap detectors 15 are provided.

Also, the above-described third embodiment has been explained for a case where the correction result detectors 30 are each arranged immediately downstream from the corresponding speed adjustment portion 12. However, there is no limitation to this and it is also possible to arrange no correction result detector 30 immediately downstream from the speed adjustment portion 12 that is arranged furthest downstream. This is because in the above-described third embodiment, the characteristic error of the conveyed items that is determined by the correction result detectors 30 is reflected in the adjustment speed of the next speed adjustment portion 12. Even if a correction result detector 30 were arranged immediately downstream of the speed adjustment portion 12 that is arranged furthest downstream, this correction result detector 30 would be used only to detect the precision of the overall gap correction portion 309.

Moreover, the above-described third embodiment has been explained for the case that the characteristic error of the conveyed item is determined based on the detection result of the correction result detector 30, and this characteristic error is reflected as a distance in the preceding gap and the following gap according to the gap detector 15. And it has been explained that the adjustment speed of the corresponding speed adjustment portion 12 is decided based on the preceding gap and the following gap in which the characteristic error is reflected. However, there is no limitation to this, and it is also possible that the characteristic error is taken as a speed, and the characteristic error is reflected in the adjustment speed that is determined from the preceding gap and the following gap according to the gap detector 15 and the result is taken as the final adjustment speed. In this case, the tables that are provided in the control device 10 are the tables 210a and 210b shown in FIG. 6A and FIG. 6B.

Furthermore, the previously described embodiments have been explained for the case that a conveying apparatus 1 for conveying postal matters, which can be e.g. sheet-shaped, is provided with a gap correction portion 9, 209 or 309. However, there is no limitation to this, and the configuration of the gap correction portion 9, 209 and 309 can be adapted to conveying apparatuses for conveying a variety of conveyed items. Moreover, explanations were given for the case that the gap detector 15 detects not only the preceding gap and the following gap of the conveyed item H, but also the length of the conveyed item. However, if the gap correction portions 9, 209 and 309 are operated properly, then it is not necessarily required to detect the length of the conveyed item.

According to at least one of the embodiments explained above, the gap correction portions 9, 209 and 309 are provided with a thickness detector 11 and decide an adjustment speed of a speed adjustment portion 12 based on the thickness of a conveyed item that is detected with this thickness detector 11. Therefore, the preceding gap and the following gap can be corrected with high precision, regardless of the thickness of the conveyed item. Moreover, the control device 10 have a correction table 10a that associates the conveyed items with correction distances. Therefore, the correction distance can be quickly determined for any thickness of the conveyed item. Thus, it is possible to increase the processing speed of the gap correction portions 9, 209 and 309.

Although an embodiment of the present invention has been described, this embodiment is proposed as an example, and is not intended to limit the scope of the invention. This embodiment can be carried out in various other modes, and omission, replacement, and modification can be made in various forms without departing from the gist of the invention. The embodiment and modifications thereof are encompassed in the scope and the gist of the invention, and are also encompassed in the invention described in the claims and the equivalents thereof.

What is claimed is:

1. A conveying apparatus, comprising:
a conveyer configured to convey conveyed items at a predetermined speed;
a speed adjustment portion arranged midway in the conveyer, the speed adjustment portion being configured to adjust the conveying speed of the conveyed items;
a thickness detector arranged further upstream in conveying direction than the speed adjustment portion, the thickness detector being configured to detect a thickness of the conveyed items;
a gap detector arranged further upstream in conveying direction than the speed adjustment portion, the gap detector being configured to detect a preceding gap between a conveyed item and the conveyed item that is conveyed immediately in front of that conveyed item and a following gap between that conveyed item and the conveyed item that is conveyed immediately behind that conveyed item; and
a control device configured to control the adjustment speed of the conveyed items by the speed adjustment portion;
wherein the control device is configured to decide a correction distance based on the thickness of the conveyed item detected by the thickness detector, to determine a corrected preceding gap by adding this correction distance to the preceding gap detected by the gap detector, to determine a corrected following gap by subtracting this correction distance from the following gap detected by the gap detector, and to decide the adjustment speed based on the corrected preceding gap and the corrected following gap.

2. The conveying apparatus according to claim 1, wherein the control device includes a correction table that associates thicknesses of the conveyed item with correction distances, and the control device is configured to reference the correction table to determine the correction distance.

3. A conveying apparatus, comprising:
a conveying portion configured to convey conveyed items at a predetermined speed;
a speed adjustment portion arranged midway in the conveying portion, the speed adjustment being configured to adjust the conveying speed of the conveyed items;
a thickness detector arranged further upstream in conveying direction than the speed adjustment portion, the thickness detector being configured to detect a thickness of the conveyed items;
a gap detector arranged further upstream in conveying direction than the speed adjustment portion, the gap detector being configured to detect a preceding gap between a conveyed item and the conveyed item that is conveyed immediately in front of that conveyed item and a following gap between that conveyed item and the conveyed item that is conveyed immediately behind that conveyed item; and
a control device configured to control the adjustment speed of the conveyed item by the speed adjustment portion;
wherein the control device is configured to decide a correction speed based on the thickness of the conveyed item detected by the thickness detector, to decide an anticipated adjustment speed based on the preceding gap and the following gap detected by the gap detector, and to decide the adjustment speed by adding the correction speed to the anticipated adjustment speed.

4. The conveying apparatus according to claim 3, wherein the control device includes:
a correction table that associates thicknesses of the conveyed item with adjustment speeds, and
an anticipated adjustment speed table that associates values obtained by subtracting following gaps from preceding gaps with anticipated adjustment speeds;
the control device deciding the adjustment speed by adding the correction speed determined by referencing the correction table to the anticipated adjustment speed determined by referencing the anticipated adjustment speed table.

5. The conveying apparatus according to claim 1, comprising:
a plurality of said speed adjustment portions;
a plurality of said gap detectors, each of the gap detectors being arranged in correspondence with one of the speed adjustment portions;
a correction result detector arranged at least immediately downstream of any speed adjustment portion other than the speed adjustment portion that is furthest downstream, the correction result detectors each detecting an after-passage preceding gap between a conveyed item that has passed the speed adjustment portion and the conveyed item that is conveyed immediately in front of that conveyed item;

wherein the control device is configured to determine a conveyed item characteristic error based on a difference between an anticipated preceding gap that is anticipated to be corrected by the speed adjustment portion and the actual after-passage preceding gap according to the correction result detector, and to reflect the conveyed item characteristic error in the adjustment speed of the speed adjustment portion provided immediately downstream of the correction result detector that has detected the after-passage preceding gap.

6. The conveying apparatus according to claim 1, further comprising:

a correction result detector arranged immediately downstream of the speed adjustment portion, the correction result detector being configured to detect an after-passage preceding gap between a conveyed item that has passed the speed adjustment portion and the conveyed item that is conveyed immediately in front of that conveyed item;

wherein the control device is configured to determine a conveyed item characteristic error based on a difference between an anticipated preceding gap that is anticipated to be corrected by the speed adjustment portion and the actual after-passage preceding gap according to the correction result detector, and to reflect the conveyed item characteristic error in the adjustment speed of the conveyed items that are conveyed thereafter.

* * * * *